(12) United States Patent
Reis

(10) Patent No.: US 6,779,560 B1
(45) Date of Patent: Aug. 24, 2004

(54) MULTIPORT VALVE

(75) Inventor: Antonio L. A. Reis, Tracy, CA (US)

(73) Assignee: Vitrom Manufacturing Consultants, Tracy, CA (US)

( * ) Notice: Subject to any disclaimer, the term of this patent is extended or adjusted under 35 U.S.C. 154(b) by 98 days.

(21) Appl. No.: 10/280,598

(22) Filed: Oct. 24, 2002

(51) Int. Cl.$^7$ ............................................. F16K 11/00
(52) U.S. Cl. ...................................... 137/864; 137/901
(58) Field of Search .................................. 137/864, 901

(56) References Cited

U.S. PATENT DOCUMENTS

| | | | | |
|---|---|---|---|---|
| 2,011,601 A | * | 8/1935 | Williams | 137/901 |
| 2,366,693 A | * | 1/1945 | Benaway | 137/901 |
| 3,045,697 A | * | 7/1962 | Seguenot | 137/864 |
| 3,171,437 A | * | 3/1965 | Suechting, Jr. | 137/864 |
| 3,774,504 A | * | 11/1973 | Bonney | 91/446 |
| 3,991,917 A | | 11/1976 | Moen | 222/486 |
| 4,072,291 A | * | 2/1978 | Adams | 251/181 |
| 4,205,821 A | | 6/1980 | Cyphelly | 251/160 |
| 4,207,914 A | | 6/1980 | Holloway et al. | 137/85 |
| 4,475,572 A | | 10/1984 | Brausfeld et al. | 137/625.23 |
| 4,534,715 A | | 8/1985 | Jones | 417/456 |
| 4,535,968 A | | 8/1985 | Gano et al. | 251/58 |
| 4,712,981 A | | 12/1987 | Gramling William D. | 417/56 |
| 4,921,598 A | | 5/1990 | Desch | 210/136 |
| 4,934,408 A | | 6/1990 | Christopherson | 137/625.46 |
| 5,074,522 A | | 12/1991 | Reynolds et al. | 251/127 |
| 5,109,887 A | * | 5/1992 | Saito et al. | 137/625.46 |
| 5,222,559 A | | 6/1993 | Edwards et al. | 166/321 |
| 5,456,581 A | | 10/1995 | Jokela et al. | 417/282 |
| 5,680,990 A | | 10/1997 | Wang | 239/247 |
| 5,839,665 A | | 11/1998 | DiVittorio | 239/310 |
| 5,911,405 A | | 6/1999 | Korczynski, Jr. et al. | 251/315.05 |
| 5,988,220 A | | 11/1999 | Sakaki | 137/625.47 |
| 6,076,711 A | | 6/2000 | McGuffey | 222/504 |

OTHER PUBLICATIONS

Book, Marks', "Standard Handbook for Mechanical Engineers", 8$^{th}$ Edition, 3 pages.

* cited by examiner

*Primary Examiner*—John Fox
(74) *Attorney, Agent, or Firm*—Thomas Schneck; Gina McCarthy

(57) ABSTRACT

A multiport valve comprising a casing having at least one fluid inlet port and at least one fluid outlet port, a seal disposed adjacent to each outlet port, a cylinder disposed within a central opening in the casing and having an axial channel with a channel surface and at least one depression within the channel and balls biased toward the cylinder and away from each outlet port. Rotating the cylinder such that the depression aligns with the ball forces the biased ball into the depression and away from the seal opening the outlet port allowing for fluid flow therethrough and rotating the cylinder such that the depression is misaligned with respect to the depression causes the channel surface to overcome the bias and force the ball against the seal thus closing the outlet port. The multiport valve may include a bearing assembly disposed between the valve casing and cylinder and a ball biasing member angled to point towards the cylinder and bearing assembly, providing for ease in rotation of the cylinder.

19 Claims, 5 Drawing Sheets

MULTIPORT VALVE

FIELD OF THE INVENTION

The invention relates to multiport ball valves for fluid handling.

BACKGROUND OF THE INVENTION

Multiway valves are known to comprise a valve casing having a valve shaft disposed within them. Typically, a valve casing has a substantially cylindrical fluid or gas chamber and inlet and outlet ports for introducing and discharging fluids and the shaft has a fluid passage that can connect the inlet port with one of the outlet ports. Rotation of the valve shaft switches fluid passage in the valve.

For example, U.S. Pat. No. 5,109,877 discloses a multiway valve in which multiple balls valves are disposed in the interior of the valve. In one embodiment of this valve, two or more balls disposed along a length of a valve shaft are used to regulate the flow of fluid through the ports. The valve shaft (e.g. a cam shaft) is rotatably inserted into a valve casing. The valve shaft may be rotated to displace the ball from a position blocking the outlet port. The fluid flows generally around the rotating valve. With the outlet port unblocked, liquid may be channeled through the valve into a desired channel.

U.S. Pat. No. 4,934,408 discloses a ball valve in which a ball may be moved from a position blocking a port by a rotatable lever. This device uses a single ball for all ports. The shaft of the lever holds a valve basket that is matched to the width of the ball. This allows the shaft to displace the ball from the port when the valve is rotated.

In order to produce a valve able to withstand high pressures, the valves of the prior art tend to incorporate many elements and are thus complex to assemble and quite costly.

It is an object of the present invention to provide a new and improved multiport valve that is durable, relatively inexpensive to manufacture, relatively easy to assemble and that has the capability of allowing for and blocking the flow of fluid, including a highly pressurized fluid, between an inlet port and an outlet port.

It is another object of the present invention to provide a multiport valve having discrete flow circuits.

It is a further object of the present invention to provide a multiport valve having a stable valve cylinder that is durable and relatively easy to rotate without damaging the cylinder.

SUMMARY OF THE INVENTION

The above object is achieved in a multiport valve featuring a rotating valve cylinder having a channel with a nested portion or depression for receiving a ball biased toward the cylinder. The rotating cylinder is disposed within an opening in the valve casing, the casing having fluid inlet and outlet ports for introducing fluid into and discharging fluid from the valve casing. The term "fluid" is meant to encompass any fluid, gas or other material desired to be used in conjunction with the valve of the present invention. An O-ring or other type of seal is disposed adjacent to the outlet port. Rotating the valve cylinder such that the nested portion aligns with the ball, forces the biased ball into the nested portion and away from the seal, thus opening the outlet port. Rotating the valve cylinder such that the nested portion is misaligned with respect to the depression causes the channel or a portion of the channel to contact the ball and to overcome the bias and force the ball against the seal, thus closing the outlet port. Any number of ports may be used. Discrete flow circuits between select ports are formed when the valve cylinder is rotated. The arrangement and number of depressions within the valve cylinder and the arrangement and number of ports determine which ports are part of the flow circuit or act as inlet or outlet ports. If a port is not adjacent to a ball, it is an inlet port when provided with fluid flow. Alternatively a port having a ball adjacent to it may also be an inlet port. The arrangements may vary as desired.

In one embodiment, a bearing is disposed in between the cylinder and the valve casing. A ball biasing member, for example a spring, is angled obtusely or acutely relative to a longitudinal axis of the cylinder, such that an end of the spring is directed toward the cylinder. Forces from the spring biased ball converge to the bearing and the bearing in turn applies the forces to the cylinder. Therefore, in order to turn the cylinder, only the force from the bearing need be overcome. This arrangement provides for a decrease in the amount of force necessary to operate the cylinder. Additionally, this arrangement improves the stability of the valve member and decreases the possibility of damaging the valve member during rotation without involving expensive solutions utilized in the prior art.

BEST MODE OF THE INVENTION

Figure 1:
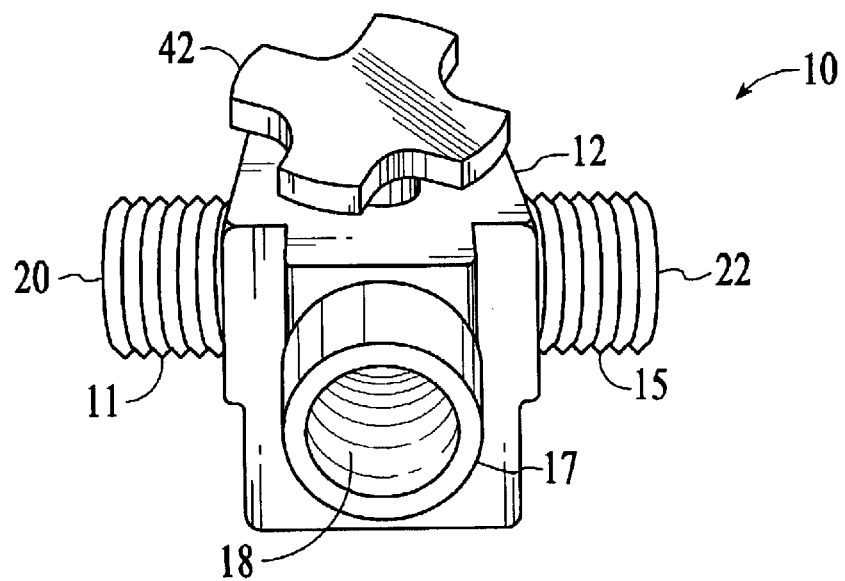
FIG. 1 is a perspective view of an embodiment of the multiport valve of the present invention.

With reference to FIGS. 1 and 2 there is seen a first embodiment of the multiport valve 10 of the present invention. A wide variety of materials may be used to manufacture the multiport valve 10 of the present invention. For example, poly-vinyl chloride or other similar plastic materials, or metals may be used. Valve 10 features a valve casing 12 and a central valve cylinder 14 disposed within a central opening 16 in the casing. The valve cylinder 14 is, for example, disposed in a slip fit fashion within the opening. The casing 12 of the valve is, for example, a single block that is manufactured by a combination of injection molding/machine operations. Ports 18, 20 and 22 are, for example, arranged at approximately right angles to each other and transverse to the central valve cylinder 14 however, other configurations, such as those that will be described below, could be used. It should be understood that a valve body incorporating a greater or lesser number of valve ports could be utilized within the scope of this disclosure. Ports 18, 20 and 22 are attached to the casing 12.

In one example of a method of manufacture of the valve 10 of the present invention, metal ports are threadably attached to the casing 12. In another example plastic ports are welded to the casing 12. In the manufacturer method, the balls 24 and 26 and O-ring seals 36 and 38, are trapped and secured within the casing 12. In this example, valve cylinder 14 cannot be removed from the casing 12 unless the balls are removed.

Valve cylinder 14, in conjunction with biased balls 24 and 26, selectively provides fluid communication between fluid inlet port or channel 18 and fluid outlet ports or channels 20 and 22. The term "fluid" is meant to encompass any fluid, gas or other material desired to be used in conjunction with the valve of the present invention. Inlet port 18 introduces fluid into the casing 12, and outlet ports 20 and 22 selectively discharge fluid from the casing 12. Ports 18, 20 and 22 include, for example, outer surfaces 11 and 15 having threads, and outer surface 17 without threads.

Mounted within the casing 12 and disposed adjacent to the valve cylinder 14 is at least one ball. Ball 24 is disposed adjacent to outlet port 20 and ball 26 is disposed adjacent to outlet port 22. The balls are made from steel, Teflon, or any suitable material that can provide a smooth ball surface. Inlet port 18 does not require that a ball be disposed within it. An inlet port can be converted to an outlet port if a ball and spring are adjacent to it, as seen with regard to outlet ports 20 and 22. The balls 24 and 26 are biased, through a spring for example, towards the central valve cylinder 14 and away from the outlet ports 20 and 22. Spring 28 biases ball 24 towards the valve cylinder 14 and spring 30 biases ball 26 towards the cylinder.

Figure 2A:
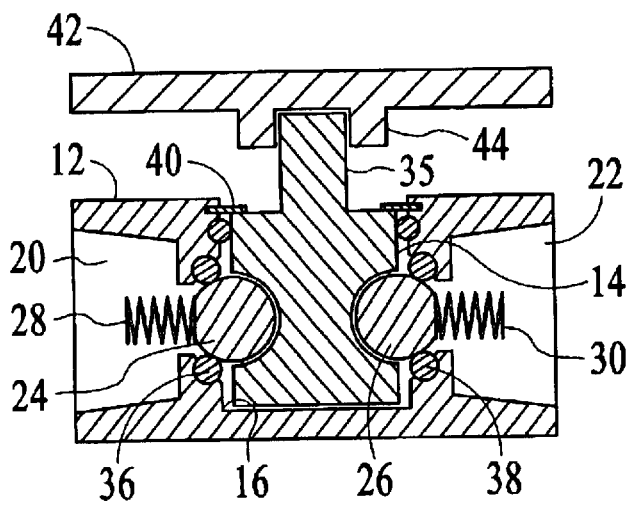
FIG. 2A is a cross sectional view of the multiport valve of FIG. 1.
Figure 2B:
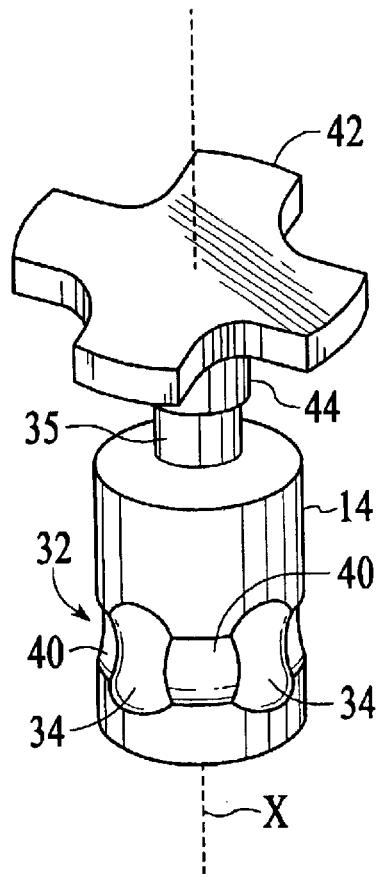
FIG. 2B is a perspective view of the valve cylinder and handle of FIG. 1.

With reference to FIG. 2B, it is seen that central valve cylinder 14 is attached to an axial handle 44 through a narrow shaft 35. Handle 44 may have a cylindrical shape and is used to rotate cylinder 14. A knob 42 may be attached to the handle 44, distal to the cylinder 14, to assist in rotating the handle. Cylinder 14 has an axial channel 32, disposed within and about a portion of the cylinder 14 and rotatable about longitudinal axis X, extending through the center of cylinder 14. Axial channel 32 has depressions 34 within the channel of a size and shape sufficient to receive at least a portion of the biased balls 24 and 26. The number of depressions, for example, equals the number of biased balls. In another example, the number of depressions is less than the number of biased balls. In between each depression 34 are channel surfaces 40 that jut out relative to the depression. Channel surface 40 may be semi-circular, have a half-round shape, or any other desired shape.

With reference to FIG. 2A it is seen that seal 36 is disposed adjacent to ball 24 and seal 38 is disposed adjacent to ball 26. The seals are, for example, O-rings or other seal assemblies known in the art. The seals 36 and 38 are selectively in contact engagement with the balls 24 and 26, respectively, thus closing off and opening the outlet ports 20 and 22 as will be described below.

The operation of the multiport valve 10 will be described with reference to FIGS. 1 to 3. The central valve cylinder 14 is selectively rotated to align one or more of the depressions 34 with spring biased ball 24 and/or 26 and is selectively rotated to misalign the depression with a spring biased ball or balls.

Figure 3A:
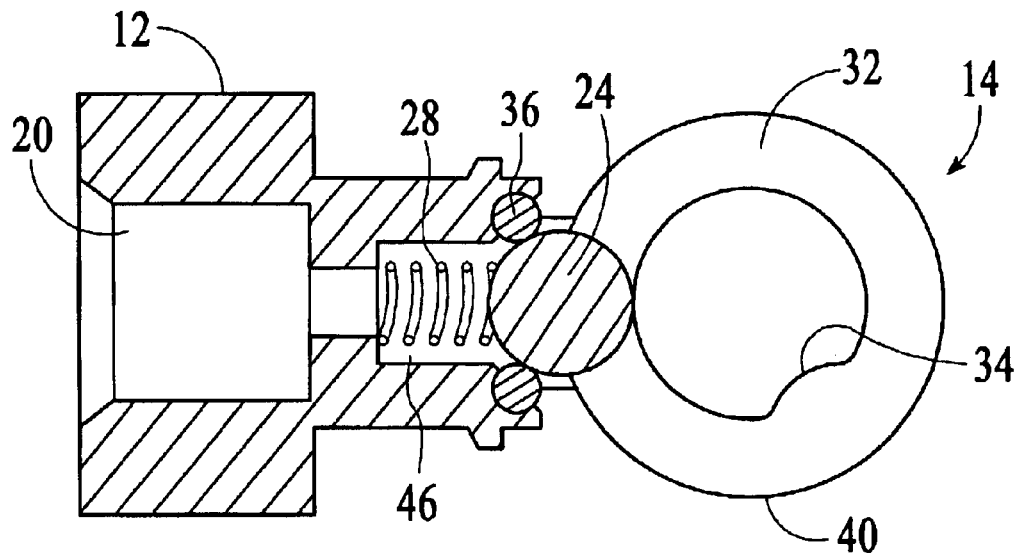
FIG. 3A is a cross sectional partial plan view of the top of the multiport valve of FIG. 1 showing the outlet port in a closed position.

In FIGS. 2A and 3A it is seen that the valve cylinder 14 is rotated such that one of the balls, for example ball 24, is disposed within the channel 32 but is not disposed within depression 34 of the channel. In this position, a surface 40, in contact with the ball 24, pushes ball 24 against the spring 28 and against O-ring 36, overcoming the force of the spring 28. A seal, for example a double seal known in the art, is thus formed between the ball 24 and the O-ring 36. Different types of seals can be created depending on the amount of force used to rotate the valve cylinder 14. The force of ball 24 against the seal 36 depends on the configuration of valve cylinder 14. Channel surface 40 maintains the ball 24 against the seal 36 when it is not aligned with the depression 34. The physical dimensions of the channel surface 40 determine the level of pressure of the ball 24 against the seal 36. That pressure is directly proportional to the amount of force that is required to turn the valve cylinder 14. Fluid released into the valve 10 from inlet port 18 (FIG. 1), is blocked from flowing to outlet port 20. Therefore, when the valve cylinder 14 is rotated such that it is misaligned with respect to the depression 34, outlet port 20 is closed and fluid is not discharged from the valve from port 20.

Figure 3B:
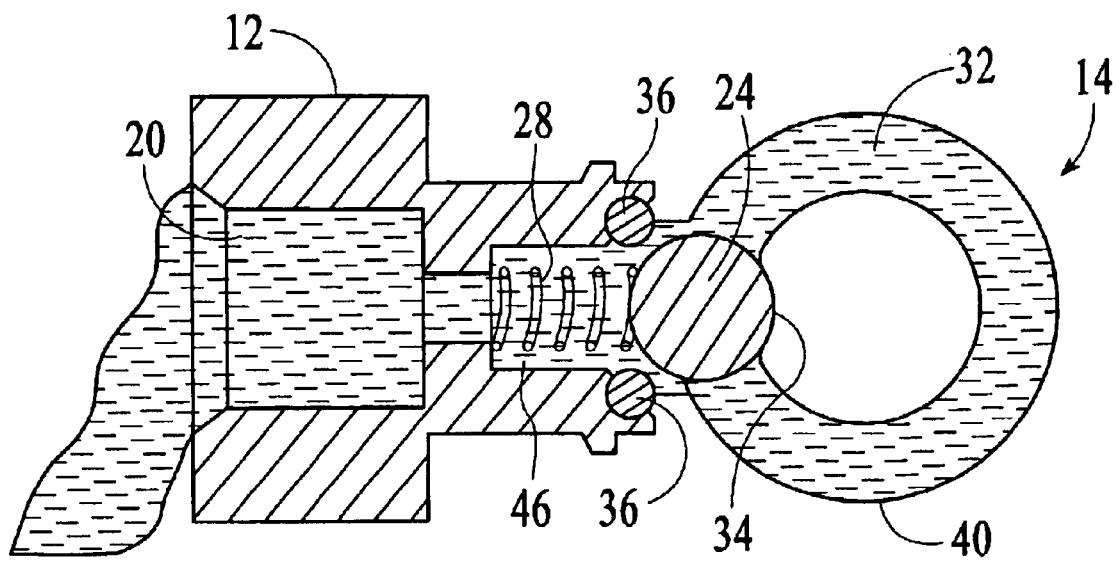
FIG. 3B is a cross sectional partial plan view of the top of the multiport valve of FIG. 1 showing the outlet port in an open position.

In FIG. 3B it is seen that the valve cylinder 14 is rotated such that the ball 24 is disposed within depression 34 of the channel 32, in addition to being disposed within the channel 32. In this position, spring 28 pushes ball 24 away from the O-ring 36 such that at least a portion of the ball 24 is received within the depression 34. The seal, seen in FIGS. 2A and 3A, is broken upon rotation of the valve cylinder 14 aligning the ball 24 with the depression 34. Thus, fluid communication between channel 32 and outlet port 20 is established as seen by the dashed lines indicating water flow. In this arrangement, the outlet port 20 is open and fluid is discharged from the valve.

In FIGS. 3A and 3B it is seen that spring 28 is disposed within spring receptacle 46 adjacent to outlet port 20. As seen in FIG. 3B when outlet port 20 is opened, fluid is free to flow from about the cylinder 14 along the channel 32, through spring receptacle 46 and out the outlet port 20.

When the fluid pressure from the inlet port 17 exceeds the force or pressure of the spring, the ball is maintained against the seal 36 even when the cylinder depression 34 is aligned with the ball 28. Thus, in this situation, the outlet port 20 remains blocked.

Rotation of the valve cylinder 14 is actuated, for example, by mounting an electrical motor (not shown) to the valve cylinder. A programmable controller and display (not shown) can also be incorporated within the valve's positioning system. The valve 10 can be actuated manually as well by, for example, using a flat blade screwdriver or similar tool (not shown).

Figure 4:
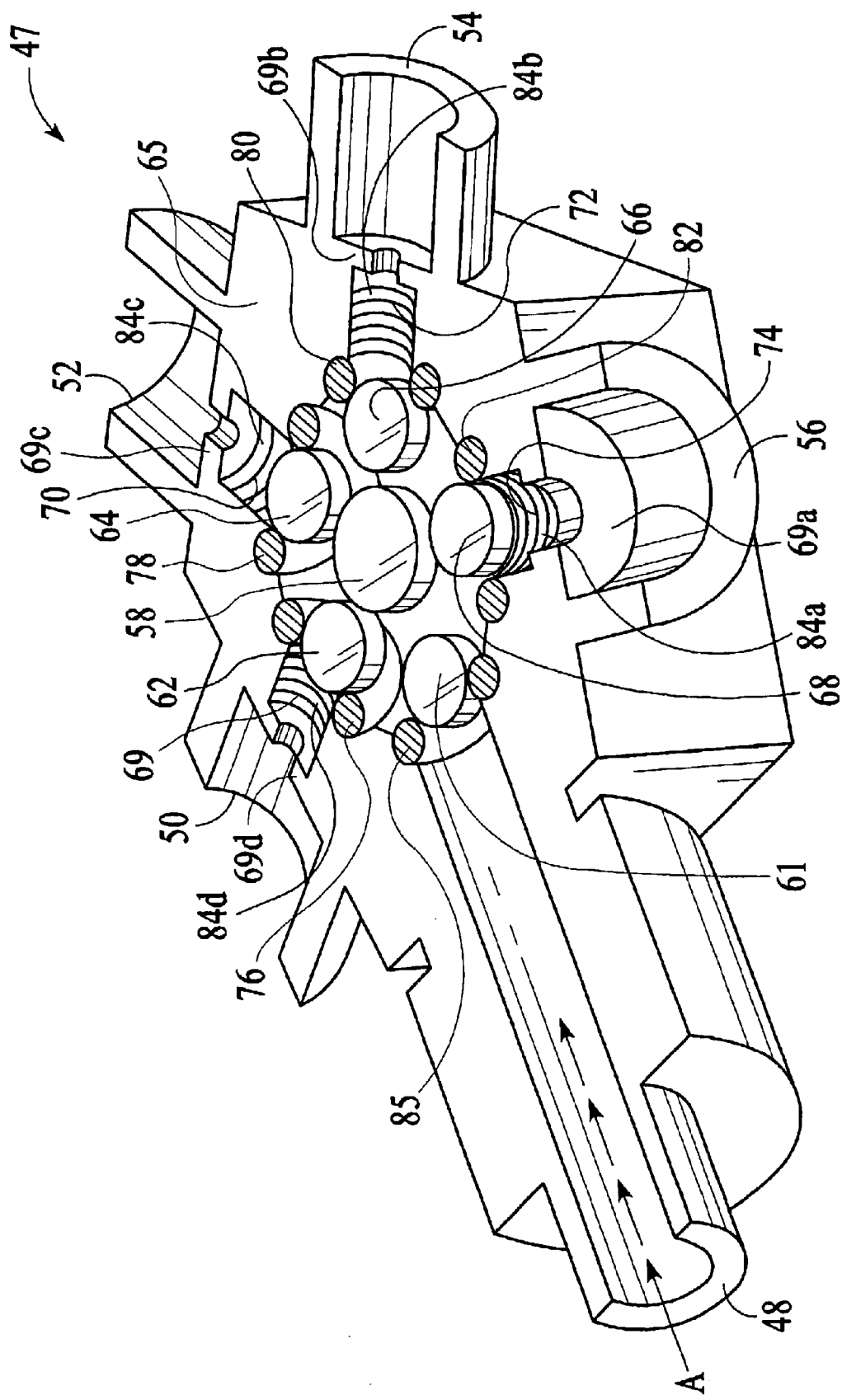
FIG. 4 is a cutaway view of another embodiment of the multiport valve of FIG. 1.

With reference to FIG. 4, a five-way valve 47 is shown having one inlet port 48 and four outlet ports 50, 52, 54 and 56. Any combination of inlet or outlet ports may be used. The valve 47 includes a central valve cylinder 58, only a lower portion of it seen here, and balls 61, 62, 64, 66, 68 (partially seen) all located within an interior of valve body 65. Balls 62, 64, 66, and 68 are associated with a spring 69, 70, 72 or 74 (partially seen). All the balls may be associated with a seal 76, 78, 80, 82 and 85 (partially seen). The springs may be disposed within receptacles. For example, receptacles 84a–d disposed adjacent to outlet ports 56, 54, 52 and 50 are formed in part by receptacle walls 69a–d. Fluid flow within inlet port 48 is indicated by the arrows labeled A. It is seen that inlet port does 48 does not require the spring, seal and ball assembly as the outlet ports do for fluid control.

Port 48 may include a ball 61 as to allow a fluid exerting enough force on ball 61 to move it away from the seal 85 and to allow fluid A to enter the interior of body 65. Alternatively, ball 61 is not present. Multiport valve 47 operates in the same way as the valve described above.

Still referring to FIG. 4, a flow circuit may be formed between inlet port 48 and one or more ports 50, 52, 54, and 56 at the same time. Fluid exits one or more of ports 50, 52, 54, and 56 if a depression (such as depression 34 of valve cylinder 14) of valve cylinder 58 is rotated to align with one or more of the balls and if the force of the fluid A is not greater than the force of the inwardly biased springs 69, 70, 72 and 74. By turning the valve cylinder 58, ports will be connected to each other forming a flow circuit. With the valve of the present invention, fluid flow circuits can be selectively formed.

In one example, the valve 47 may provide a discrete flow circuit between port 48 and port 54. The valve cylinder 58 is rotated such that the ball 61 is aligned with a depression (such as depression 34 of cylinder 14) of valve cylinder 58. Liquid is introduced into port 48 and the pressure of the liquid on the ball 61 will force the ball into the depression 34, and away from the seal 85, such that fluid can be introduced through port 48 into valve body 65. Another depression of valve cylinder 58 is also in alignment with ball 66 adjacent to outlet port 54. Ball 66 is forced into the depression 34 of cylinder 58 and away from the seal 80. Thus, a flow circuit is formed between ports 48 and 54. In another example, when the valve cylinder 58 is rotated so that a depression (such as depression 34) aligns with ball 64, a flow circuit may be formed between port 48 and port 52.

The valve of the present invention is advantageous in that any number of the ports may be inlet or outlet ports. For example, ports 48, 50, 52 and 54 may be inlet ports and 56 may be an outlet port. The valve cylinder 58 and depression may be designed such that ports 48 and 52 discharge fluid to outlet port 56 and, when the valve is rotated, ports 50 and 54 discharge fluid to ports 48 and 52 for cleaning or drying. This is useful, for example, in valves that require washing after dispensation of a fluid or in a clean industrial process. It is therefore seen that various flow circuits can be selectively formed depending on the number and arrangement of depressions on the valve cylinder 58 and the number and arrangement of inlet and outlet ports.

Figure 5A:
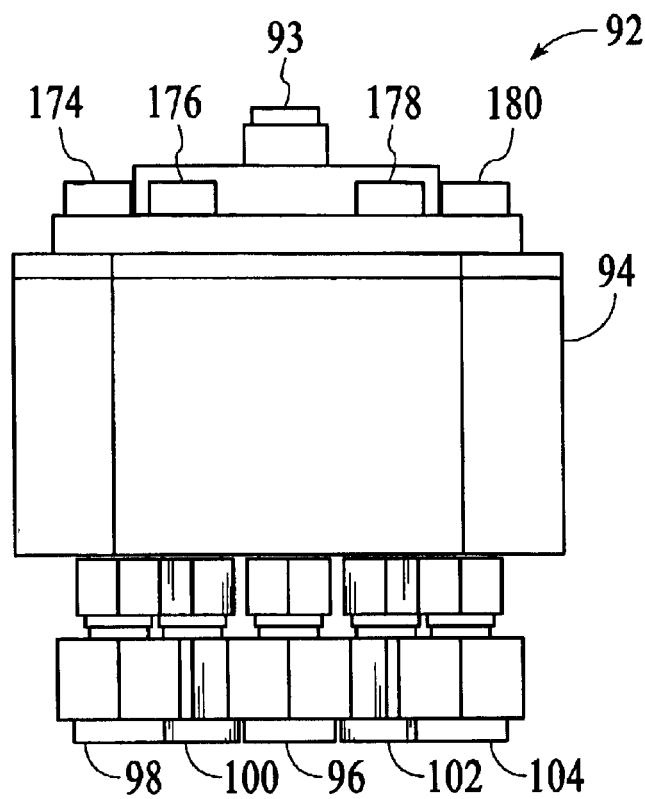
FIG. 5A is a plan side view of another embodiment of the multiport valve of FIG. 1.
Figure 5B:
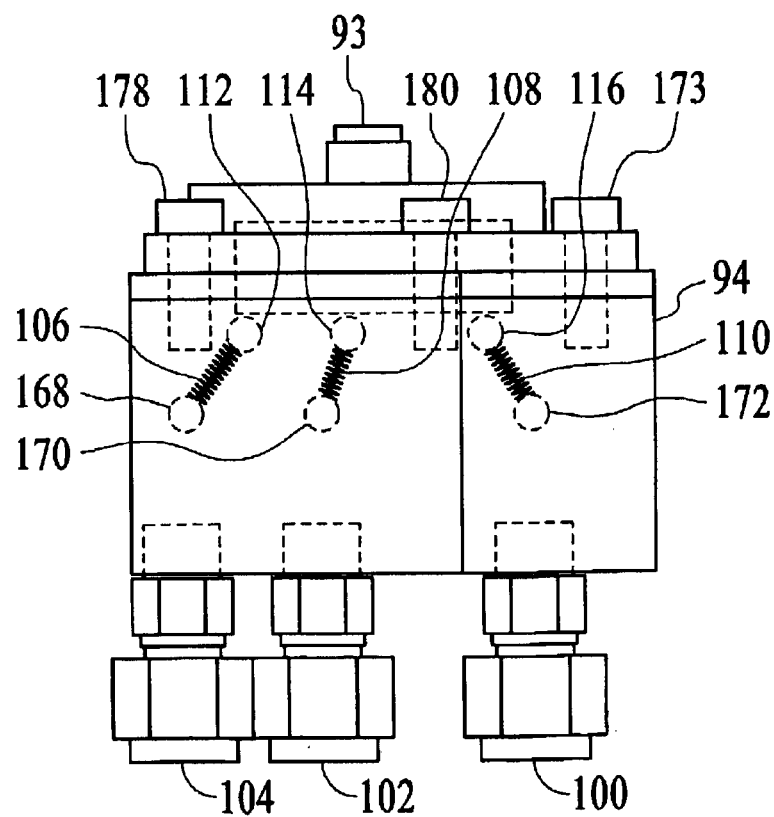
FIG. 5B is a cross sectional view of another side of the multiport valve of FIG. 5A.
Figure 6A:
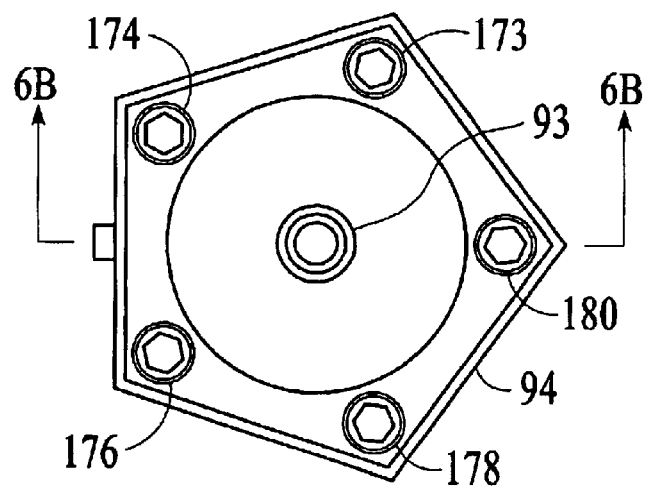
FIG. 6A is a top plan view of the multiport valve of FIG. 5B.
Figure 6B:
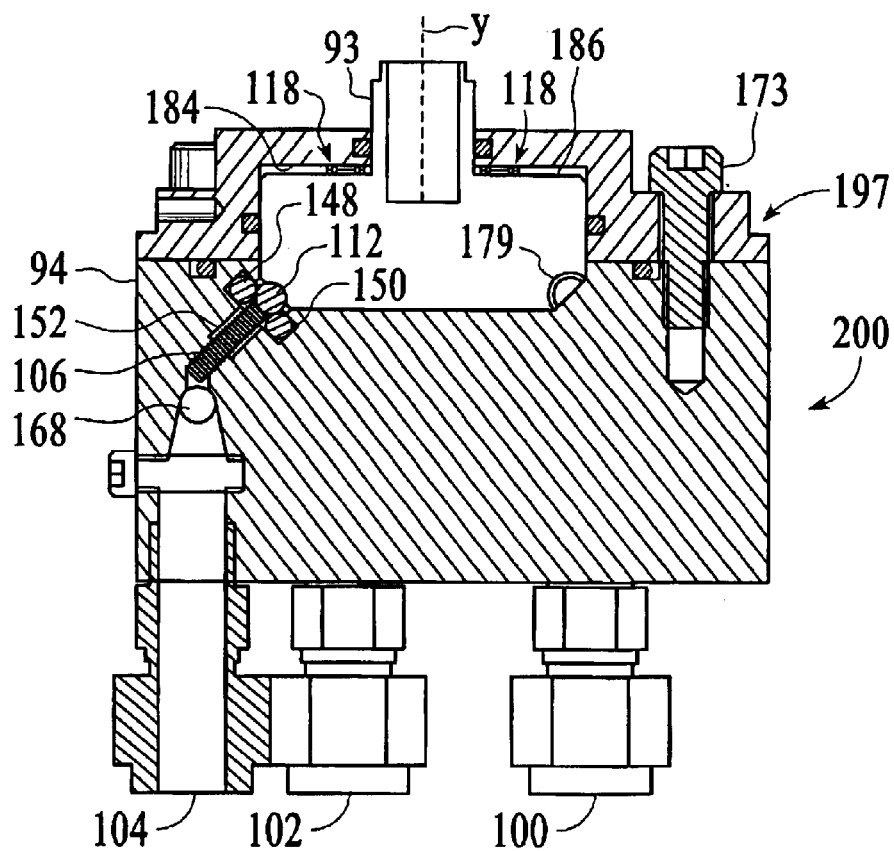
FIG. 6B is a partial cross sectional view of the multiport valve of FIG. 6A taken along the lines 6B–6B.

With reference to FIGS. 5 and 6 another embodiment of the present invention is seen. This embodiment is depicted as having five ports, however any number of ports may be used. Multiport valve 92 includes a casing 94, inlet port 96 and outlet ports 98, 100, 102, 104. In FIG. 6B, valve cylinder 93 was rotated such that ball 112 was forced to contact adjacent seal 148 forming a seal and blocking port 104 in the same manner as described above, so that fluid communication between the inlet port 96 and outlet port 104 cannot occur. Seal 148 is received within a receptacle 150 and spring 106 is at least partially received within receptacle 152. As stated above, rotating the valve cylinder 93 so that a depression, such as 179, is aligned with the ball 112 causes at least a portion of the ball to be received within the depression destroying the seal and thus opening port 104.

Four springs are associated with each of the four outlet ports. Three springs 106, 108 and 110 are seen adjacent to balls 112, 114 and 116 in FIG. 5B. The springs are disposed at an angle that is either oblique or acute to an axis Y of central valve cylinder 93 (FIGS. 5B and 6B) depending upon the spring location within the body 94, such that each spring converges or points toward the cylinder 93 and more particularly toward bearing 118 (FIG. 6B). In FIG. 6B it is seen that spring 106 is angled acutely with respect to longitudinal axis Y. Bearing 118 is disposed in between the valve casing 94 and valve cylinder 93. Specifically, in one example, it is disposed between a surface 186 of valve cylinder 93 and a surface 184 of valve casing 94 allowing for smooth rotation of the valve cylinder 93.

The springs, angled relative to the central cylinder 93, provide for a decrease in the amount of torque necessary to operate and turn the valve member and also increase the stability of the valve cylinder 93. In this embodiment the forces from each of the balls (balls 112, 114 and 116 are shown) being pushed by their respective springs (springs 106, 108 and 110 are shown) converge to bearing 118 adjacent to the valve member 93. The bearing 118 applies a relatively balanced force on the valve member. In order to turn the valve member 93 only the force applied to the valve member 93 from the bearing 118 need be overcome. This arrangement of the springs and the bearing assembly adjacent to the valve cylinder 93 improves the stability of the valve cylinder 93 and decreases the possibility of damaging the valve 93 cylinder during rotation without involving expensive solutions necessary in the prior art for producing valve cylinder tolerance.

Figure 6C:
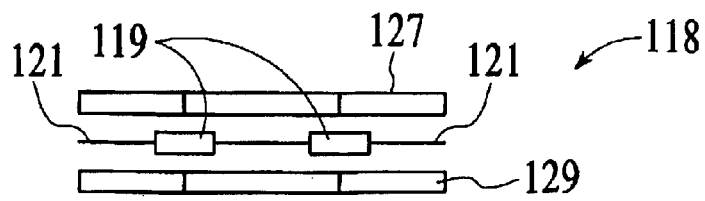
FIG. 6C is a plan view of the bearing assembly of FIG. 6B.

Furthermore, the use of the bearing 118 reduces friction that may otherwise be present between surface 186 of valve cylinder 93 and inner surface 184 of the body 94. In one example, the bearing 118 is a thrust bearing assembly known in the art. With reference to FIG. 6C, it is seen that thrust bearing assembly 118 includes hard steel balls or rollers 119 disposed on a plate 121 and in between plates 127 and 129. The bearing assembly 118 is designed to carry axial loads on a shaft or cylindrical valve 93. Plates 121, 127 and 129, are for example, circular plates with openings (not shown) therebetween. The bearing assembly 118 reduces friction as the valve member 93 is rotated against the bearing plate 127.

Check valves, corresponding to outlet ports, seen in FIGS. 5 and 6 prevent reverse flow of fluid that has entered outlet ports 98, 100, 102 and 104. Only check valves 168, 170 and 172 corresponding to ports 104, 102 and 100 are depicted.

Socket head screws 173, 174, 176, 178 and 180 secure an upper portion 197 of the casing 94 to a lower portion 200 of the casing 94.

The multiport valve of the present invention can be customized to a specified process by taking into consideration the delivery system requirements. In some processes the single valve can replace complex systems employing several valves. The number and location of inlet and outlet ports and depressions can vary as desired. The valve can work to open outlet ports simultaneously or sequentially depending upon the configuration of the valve. The low cost multi-port manual valves provide a compact high purity delivery system.

What is claimed is:

1. A multiport valve comprising:
   a casing having a fluid inlet port, a fluid outlet port, and an opening transverse to said ports therethrough;
   a cylinder having an axial channel with a channel surface and a depression therein, said cylinder rotatably inserted in said casing opening;
   a seal disposed adjacent to said outlet port; and
   a ball mounted within said casing adjacent to said seal and biased toward said cylinder, wherein said depression may be selectively aligned with said biased ball positioning said biased ball away from said seal for opening said outlet port, and wherein said depression may be selectively misaligned with respect to said biased ball and aligned with respect to said channel surface positioning said ball in sealing engagement with said seal for closing said outlet port.

2. The valve of claim 1 further comprising a spring disposed within said casing and adjacent to said ball.

3. The valve of claim 1 wherein said cylinder includes a knob disposed on an upper surface.

4. The valve of claim 1 wherein said casing includes a central opening and said cylinder is disposed in a slip fit manner within said opening.

5. The valve of claim 1 wherein said seal is an O-ring.

6. The valve of claim 1 wherein said outlet ports are disposed on opposed ends of said casing.

7. The valve of claim 1 wherein said depression is of a shape and size so as to be capable of partially receiving said balls.

8. The valve of claim 1 further comprising a handle coaxial with said cylinder.

9. The valve of claim 8 further comprising a knob attached to said handle and distal to said cylinder.

10. The valve of claim 8 further comprising a shaft connecting said cylinder to said handle.

11. The valve of claim 1 wherein said casing has at least two outlet ports.

12. The valve of claim 1 wherein said axial channel is a fluid channel.

13. The valve of claim 1 further comprising a plurality of balls and a plurality of depressions.

14. A multiport valve comprising:
a casing having an inlet port, an outlet port, an opening transverse to said ports therethrough wherein said inlet port is in fluid communication with said casing;
a cylinder having an axial channel with a channel surface and a depression therein, said cylinder rotatably inserted in said valve casing opening;
a seal disposed adjacent to the outlet port; and
a ball mounted within said casing adjacent to said seal and biased toward said cylinder, wherein said depression may be selectively aligned with said biased ball positioning said ball away from said seal and placing said outlet port and said casing in fluid communication, and wherein said depression may be selectively misaligned with respect to said biased ball and aligned with respect to said channel surface, positioning said ball in a sealing engagement with said seal thus blocking fluid communication between said outlet port and said casing.

15. The multiport valve of claim 14 wherein said depression is of shape so as to be capable of partially receiving said ball.

16. The multiport valve of claim 14 further comprising a plurality of balls and a plurality of depressions.

17. A multiport valve comprising:
a casing having a fluid inlet port, a fluid outlet port, and a central opening;
a cylinder having a longitudinal axis, a channel disposed about said longitudinal axis said channel having a channel surface and a depression therein, said cylinder rotatably inserted in said valve casing opening;
a seal disposed adjacent to the outlet port; and
a bearing disposed in between said cylinder and said casing;
a biasing member disposed within said valve casing and angled obtusely or acutely with respect to said longitudinal axis such that said biasing member points toward said cylinder; and
a ball mounted within said casing adjacent to said biasing member and biased toward said cylinder wherein said cylinder may be selectively rotated against said bearing such that said depression may be aligned with said biased ball positioning said ball away from said seal for opening the outlet port, and wherein said cylinder may be selectively rotated against said bearing such that said depression may be selectively misaligned with respect to said biased ball and aligned with respect to said channel surface, positioning said ball in a sealing engagement with said seal thus closing said outlet port.

18. The multiport valve of claim 17 wherein said bearing includes a pair of plates, and rollers disposed in a third plate, said third plate disposed between said pair of plates.

19. The multiport valve of claim 17 wherein said casing includes a lower surface, said cylinder includes and upper surface and said bearing is located between said surfaces.

* * * * *